May 6, 1952     K. M. SIMPSON ET AL     2,595,611
IONIZATION GAUGE
Filed April 24, 1947     2 SHEETS—SHEET 2
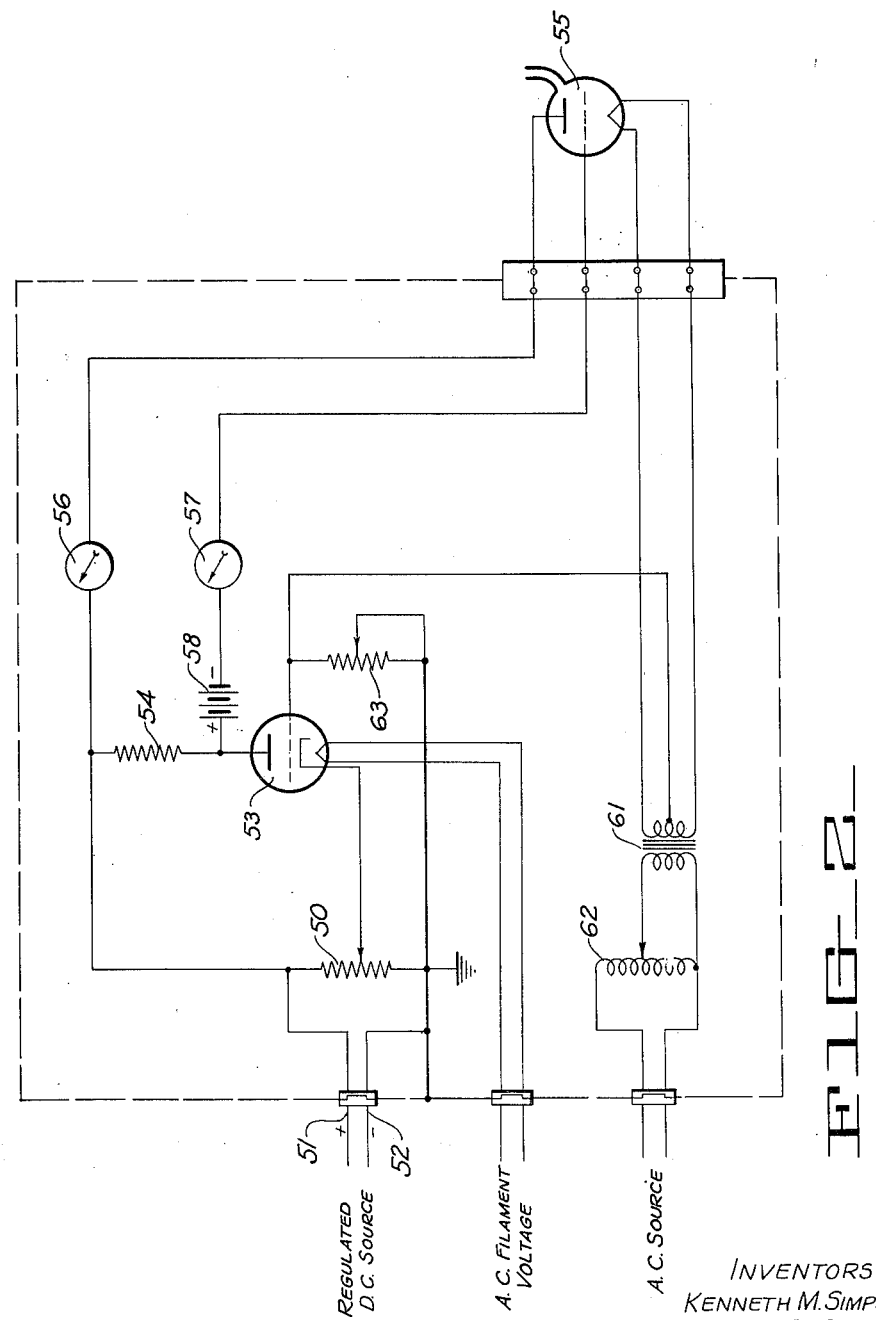
INVENTORS
KENNETH M. SIMPSON
WILLIAM R. BAKER
QUENTIN A. KERNS
BY
ATTORNEY

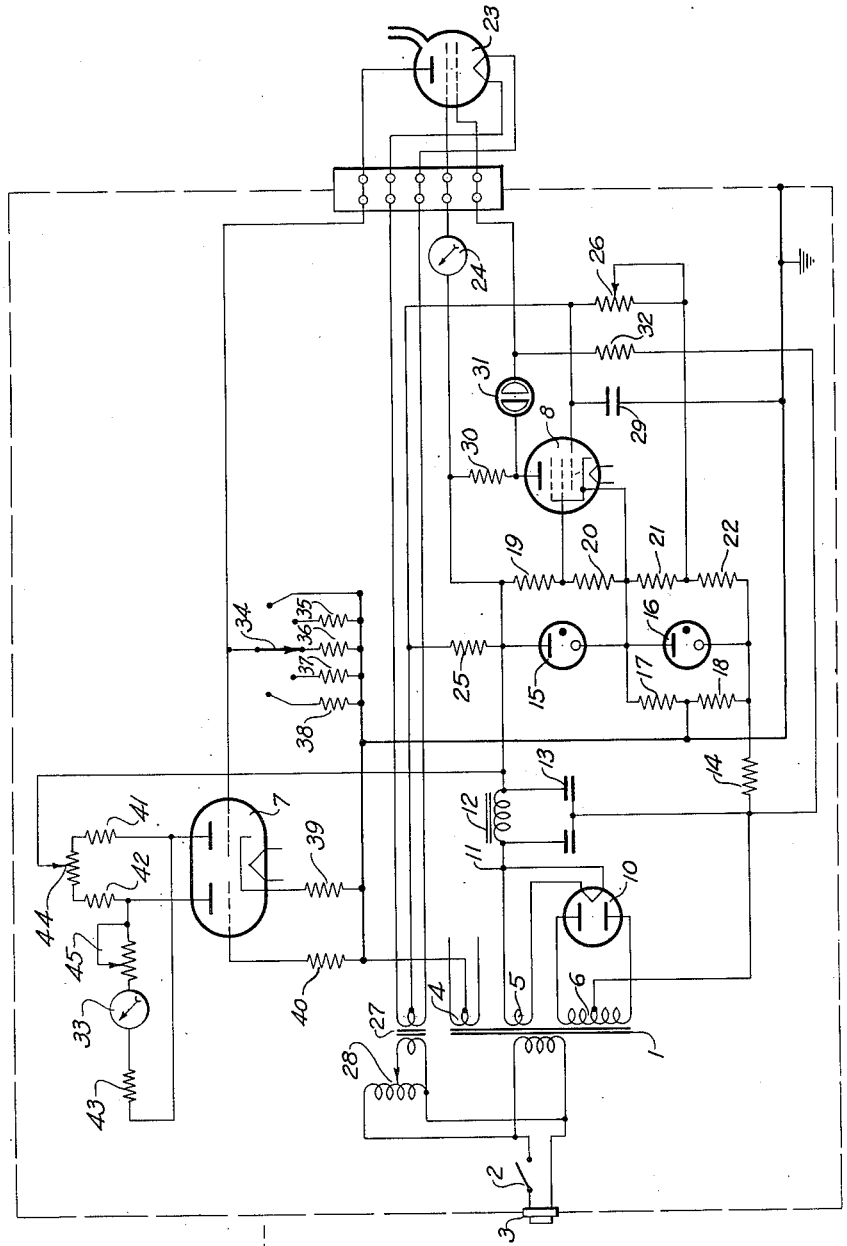

Patented May 6, 1952

2,595,611

UNITED STATES PATENT OFFICE 2,595,611

IONIZATION GAUGE

Kenneth M. Simpson, Santa Barbara, and William R. Baker and Quentin A. Kerns, Berkeley, Calif., assignors to the United States of America as represented by the United States Atomic Energy Commission Application April 24, 1947, Serial No. 743,488

6 Claims. (Cl. 175—183)

This invention relates to electronic pressure gauges and more particularly to a type of electronic pressure gauge having simple automatic ionizing electron stream regulation which will give a continuous indication of pressure.

In the past it has been the practice to maintain the electron stream current at a constant value by regulating or adjusting the filament temperature, resulting in the necessary use of complicated and bulky regulator apparatus, especially where heavy filaments requiring large currents are used. In accordance with this invention described hereinafter, a new and improved electronic pressure gauge is provided which is simple in construction and automatically regulates the ionizing electron stream.

It is therefore an object of this invention to provide a new and improved electronic pressure gauge.

Another object of this invention is to provide a new and improved electronic pressure gauge which achieves a simple arrangement to maintain a constant ionizing electron stream in order to obtain accurate and steady pressure readings.

A further object of this invention is to provide an electronic ionization gauge which is adaptable to simple electronic regulation of the ionizing current flow therein.

Still further objects and advantages of the invention will be apparent in the following description and claims considered together with the accompanying drawing in which:

Figure 1 is a schematic wiring diagram of an electronic pressure gauge utilizing a tetrode type ionization gauge.

Fig. 2 is a schematic wiring diagram of an electronic pressure gauge utilizing a triode type of ionization gauge.

Referring now to Fig. 1 in detail, reference is made to the power supply circuit which is a conventional full wave rectifier type. A transformer 1 is a standard conventional type with the primary winding connected to an external alternating current source through an on-off switch 2 and a plug 3. The secondary windings of said transformer 1 are designated as 4, 5 and 6. Secondary winding 4, the center tap of which is grounded, is an alternating current source to supply heater voltages to the double triode tube 7 and the pentode tube 8. Winding 5 furnishes an alternating current source of heater voltage for a double diode type rectifier tube 10 and furnishes a connection 11 for the positive side of the rectified voltage. The two leads of winding 6 are connected to the plate terminals of said tube 10 so that a full wave rectified voltage is obtained between the center tap of said winding 6 and connection 11. The rectified voltage thus developed is impressed on a filter circuit consisting of an inductor 12 and a capacitor 13 for control of ripple voltages and is a source of a filtered voltage. Said filtered voltage is then applied to a voltage regulator circuit comprising a resistor 14 and two gas discharge tubes, 15 and 16, which furnish a stabilized voltage to a voltage divider circuit comprising several resistors 17, 18, 19, 20, 21 and 22. The voltage thus developed across said resistors 19, 20, 21 and 22 furnishes the operating potentials for the plate electrode of said tubes 7 and 8, and for the screen grid of the tetrode ionization gauge 23 through a milliammeter 24. The voltage across said resistors 20, 21 and 22 is connected to the screen grid of said tube 8 to supply the necessary operating potential. The voltage across said resistors 21 and 22 is applied to the cathode of said tube 8. The voltage across said resistors 19, 20 and 21 is connected across another voltage divider circuit comprising a resistor 25 and a potentiometer 26. The voltage across said potentiometer 26 supplies the control grid potential for said tube 8 and can be varied by adjusting said potentiometer.

The screen grid of the tetrode ionization gauge 23 is connected to the positive side of the power supply through milliammeter 24 which indicates the electron stream current in said gauge. The filament leads of the tetrode ionization gauge 23 are connected to the secondary terminals of a transformer 27. The primary winding of said transformer 27 is connected to a variac 28 which is in turn connected in parallel with the primary winding of the transformer 1. Thus the filament voltage and temperature of the ionization gauge 23 may be adjusted by changing the position of the movable arm of variac 28. Since the electron stream of said ionization gauge is a function of the filament temperature, the variac 28 thereby adjusts the electron stream. The filament of the ionization gauge is coupled to the control grid of a regulator tube 8, through the center tap of the transformer 27, so that the sensitivity of said regulator tube to changes of electron current of said gauge 23 may be adjusted by changing the effective resistance of the potentiometer 26. Said variac 28 is adjusted for a standard amount of electron current and any change in the electron current from its adjusted value results in a change in the voltage drop across the potentiometer 26, resulting in an in-phase change in the bias on the control grid across the capacitor 29 of the regulator tube 8. The plate of said tube 8 is connected to the positive side of the power supply through a resistor 30 and voltage changes at the plate are coupled to the control grid of the ionization gauge 23 through the glow discharge tube 31 and across the resistor 32. The voltage changes thus applied to the grid of the ionization gauge 23 are in opposite phase to the voltage change at the filament, resulting in an opposition to any fluctuation in the electron current of said gauge 23. The positive ions formed by the electron stream in the ionization gauge 23 are collected by the plate of said gauge 23 and the positive ion current thereby produced is proportional to the pressure and is measured by the conventional multiscale electronic meter comprising a double triode tube 7, a meter 33, a switch 34, a plurality of resistors 35, 36, 37, 38, 39, 40, 41, 42, 43, and two potentiometers 44 and 45.

In the operation of the invention, the ionizing electron stream current, as measured by the meter 24, may be adjusted to a predetermined value by changing the variable element of the variac 28. Thereafter, any fluctuation of said ionizing electron stream current from said predetermined value at the cathode of said ionization gauge 23 is coupled to the control grid of the regulating tube 8, through the center tap of the secondary winding of the filament transformer 27, across said potentiometer 26. The resulting change of voltage at the control grid of said tube 8 causes a voltage change of opposite phase in the plate circuit of said tube 8, which is then impressed on the control grid of said ionization gauge 23. Since said voltage change at the control grid of said gauge 23 is in opposition to the original fluctuation of the ionizing electron stream at the cathode, said ionizing electron stream is held constant. The positive ions formed in said ionization gauge 23 are collected and the resulting current is measured by the meter 33 in the electronic meter circuit as an indication of pressure.

In Fig. 2 is illustrated another electronic pressure gauge, wherein a potentiometer 50 is connected between two input leads 51 and 52 which furnish a positive regulated direct current source for the circuit. The movable arm of said potentiometer 50 is connected to the cathode of a vacuum tube 53, which is a regulator tube, and is a means for adjusting the operating voltage applied to said cathode. The positive side of said potentiometer 50 is connected to the plate of said regulator tube 53, through a dropping resistor 54, and is further connected to the plate electrode of the triode ionization gauge 55 through a meter 56. The control grid electrode of said ionization gauge 55 is coupled to the plate of said regulator tube 53 through a meter 57 and a series of batteries 58 so connected that said control grid electrode of the ionization gauge 55 is maintained sufficiently negative to attract the positive ions formed by the electron stream current in said gauge 55. The filament electrode of said ionization gauge 55 is connected to the secondary winding of a conventional filament transformer 61 and the primary winding of said transformer 61 is connected to a variac 62. Said variac 62 is further connected to an external alternating current source and is used to adjust the filament electrode temperature of said gauge 55. Since the filament temperature is a function of the electron stream current, said variac adjusts the electron stream current as measured by the meter 56. To regulate changes in the electron stream current of said gauge 55, the filament electrode is coupled to the control grid of the regulator tube 53 through the center tap of the filament transformer 61 and across a grid biasing potentiometer 63. Said potentiometer 63 may be adjusted to increase or decrease the sensitivity of said regulator tube 53 to changes of electron stream current. Thus any change in electron stream current, from the adjusted value, at the filament electrode of the gauge 55 is coupled to the control grid of the regulator tube 53 resulting in a change of opposite phase in the plate circuit of said tube 53 which is in turn coupled to the control grid electrode of said gauge 55 and which prevents fluctuations of the electron stream current. Since the control grid electrode of the ionization gauge 55 is maintained sufficiently negative to attract the positive ions within said gauge 55, a measurement of the current in the control grid circuit is an indication of the pressure and this is accomplished by the meter 57. For best results the triode tube used as the ionization gauge 55 should have a low amplification factor, approximately three, as a negative control grid bias, which always exceeds that necessary to collect the positive ions formed by the electron stream from filament to plate, is needed during the entire operation of the tube.

While I have described the salient features of this invention in detail with respect to one embodiment it will, of course, be apparent that numerous modifications may be made within the spirit and scope of this invention and I do not therefore desire to limit the invention to the exact details shown except insofar as they may be defined in the following claims.

What is claimed is:

1. Apparatus for measuring pressure comprising an ionization gauge having an electron emissive electrode, a control grid electrode at a negative potential relative to said electron emissive electrode, a screen grid electrode at a positive potential relative to said electron emissive electrode, and a plate electrode at a negative potential relative to said electron emission electrode to collect the positive ions formed in said ionization gauge, means for adjusting the temperature of said electron emissive electrode, a vacuum tube regulator having at least a cathode, a control grid, and an anode, means for coupling electron stream current changes at the electron emissive electrode of said ionization gauge to the control grid of said vacuum tube regulator, means for coupling current changes at the anode of said vacuum tube regulator which are in opposite phase relative to current changes at the electron emissive electrode of said ionization gauge to the control grid electrode of said ionization gauge thus preventing fluctuations in electron stream current, means for indicating electron stream current flow at the screen grid electrode of said ionization gauge, and means for measuring the amount of current flowing in the plate electrode circuit of said ionization gauge which is proportional to the pressure.

2. In combination, an ionization gauge comprising an electron emissive electrode, a second electrode at a negative potential relative to said electron emissive electrode, a third electrode at a positive potential relative to said electron emissive electrode between said electrodes and a fourth electrode at a negative potential relative to said electron emissive electrode between said third electrode and said electron emissive electrode, a vacuum tube regulator connected to said fourth electrode to regulate the electron stream current in said ionization gauge in response to variations in said electron stream at said first electrode, a power supply connected to said regulator and gauge comprising an alternating and direct current source to supply operating voltages, a meter connected to said third electrode to measure electron stream current, and a vacuum tube voltmeter connected to said second electrode to measure the positive ion current flowing from said second electrode of said ionization gauge as an indication of pressure.

3. In a pressure measuring circuit, the combination comprising an ionization gauge having at least an electron emissive filament, a grid electrode, and an ion collecting electrode, a source of alternating current, a transformer having a winding connected across said source and a center tapped winding directly connected across said filament, means connected between said center tap and one of said electrodes for establishing an electron stream through said gauge, means connected to said center tap for producing a voltage proportional to a change in the value of said electron stream, electronic tube means connected between said voltage producing means and one of said gauge electrodes for altering the relating potential of said electrode with respect to said filament in opposition to said change in electron current, and means connected to said ion collecting electrode for measuring ion current as a function of pressure.

4. In a pressure measuring apparatus, the combination comprising an ionization gauge having an electron emissive filament, a control grid electrode, a screen grid electrode, and an anode, means connected across said filament for rendering said filament electron emissive, a unidirectional power supply connected to the elements of said gauge so that said control grid is negative with respect to said filament, said screen grid is positive with respect to said filament, and said anode is negative with respect to said filament whereby an electron current flows between said filament and said screen grid, a vacuum tube regulator having an input and an output, means connected between said filament and the input of said regulator for applying a voltage proportional to the electron current at said filament, and means coupling the output of said regulator to said control grid in opposition to a variation in said electron current to overcome such variation, and means connected to said anode for indicating current flow thereat as an indication of current in said gauge.

5. In a pressure measuring apparatus, the combination comprising an ionization gauge having an electron emissive filament, a control grid, and an anode, means connected across said filament for rendering said filament electron emissive, a unidirectional power supply connected to the elements of said gauge to render said anode positive with respect to said filament, a vacuum tube regulator having an input and an output, means connected between said filament and the input of said regulator for applying a voltage proportional to the electron current through said gauge, and a source of bias voltage having the positive terminal thereof connected to the output of said regulator and the negative terminal thereof connected to said control grid through an ammeter, whereby the electron current of said gauge is regulated and the indication of said ammeter is proportional to pressure in said gauge.

6. In a pressure measuring apparatus, the combination comprising an ionization gauge having an electron emissive filament, a control grid, and an anode, means connected across said filament for impressing a fixed value of voltage, a unidirectional power supply having the positive terminal thereof connected to the anode of said gauge through a first ammeter, a first potentiometer having the two fixed ends thereof connected across said unidirectional power supply, a triode regulator tube having at least an anode, a control grid, and a cathode, the cathode of said regulator tube being connected to the variable element of said first potentiometer, a second potentiometer having one fixed end connected to the negative terminal of said unidirectional power supply and the other fixed end connected to the control grid of said regulator tube which is directly connected to said filament, the variable element of said second potentiometer being connected to one of the fixed ends thereof, a dropping resistor connected between the positive terminal of said unidirectional power supply and the anode of said regulator tube, and a source of bias voltage having the positive terminal thereof connected to the anode of said regulator tube and the negative terminal thereof connected to the control grid of said gauge.

KENNETH M. SIMPSON.
WILLIAM R. BAKER.
QUENTIN A. KERNS.

REFERENCES CITED

The following references are of record in the file of this patent:

UNITED STATES PATENTS

| Number | Name | Date |
| --- | --- | --- |
| 1,438,976 | Wold | Dec. 19, 1922 |
| 1,649,016 | Buckley | Nov. 15, 1927 |
| 2,334,356 | Salzberg et al. | Nov. 16, 1943 |
| 2,442,518 | Stratton | June 1, 1948 |
| 2,454,564 | Nelson | Nov. 23, 1948 |
| 2,455,437 | Nagel et al. | Dec. 7, 1948 |
| 2,537,775 | MacNeille | Jan. 9, 1951 |